United States Patent Office 3,433,587
Patented Mar. 18, 1969

3,433,587
METHOD FOR PREPARING CRYSTALLINE ZEOLITE CATALYST
Walter L. Haden, Jr., Metuchen, and Frank J. Dzierzanowski, Somerset, N.J., assignors, by mesne assignments, to Engelhard Minerals & Chemicals Corporation, Menlo Park, Edison, N.J., a corporation of Delaware
No Drawing. Filed Oct. 22, 1965, Ser. No. 502,357
U.S. Cl. 23—112          10 Claims
Int. Cl. C01b 33/28

ABSTRACT OF THE DISCLOSURE

In the preparation of a microspherical crystalline zeolitic cracking catalyst from a reaction mixture including calcined kaolin clay and sodium hydroxide solution, the reactants are spray dried while controlling the proportion of carbon dioxide in the atmosphere relative to the oxides of sodium in the particles. The particles are crystallized after formation by spray drying.

---

This invention relates to the preparation of catalysts. The invention relates, more specifically, to the preparation of catalytic masses in the form of finely divided, substantially spherical particles which are useful particularly in fluidized solids systems. The type or class of active contact mass to which this invention is directed is a composite including a crystalline zeolite as a component.

Contact masses for fluid processes must be small enough to permit their suspension in the stream of hydrocarbon vapors being contacted so that the resulting solid-gas system assumes the flow characteristics of a fluid. Experience has shown that the particles preferably should be small, generally spherical particles which are usually designated "microspheres." These spheres are normally from about 20 to about 150 microns in equivalent spherical diameter. In addition to possessing the desired degree of activity and selectivity, such contact masses must be sufficiently hard to resist attrition.

Microspherical catalyst particles suitable for use in fluid bed catalytic conversion processes are frequently prepared by spray drying techniques. An aqueous slurry of suitable composition is sprayed into an atmosphere of hot gases, forming microspheres which are subsequently activated by calcination. This technique has been used successfully to prepare amorphous gel catalysts.

In recent years great interest has developed in a new type of catalyst which contains as a constituent a specific type of zeolite, namely a rigid crystalline zeolite having uniform pore openings within the range of 6 to 15 angstrom units. This type of zeolite is usually referred to as a "molecular sieve."

The nature of the crystalline zeolite constituent present in these catalysts and the performance characteristics of the catalysts are described in an article by Ryle Miller, "Molecular Sieve Catalysts," Chemical Week, Nov. 14, 1964, pp. 78–85. An essential feature of this type of catalyst is that the zeolite is crystalline. Amorphous zeolites of similar chemical analysis do not possess the desirable properties of the crystalline zeolite catalysts.

Fluid molecular sieve catalyst particles in the form of microspheres can be obtained by initially precipitating the crystalline zeolite as a micron-size powder from dilute high purity sources of oxides of sodium, aluminum and silicon. Typically, high purity sodium silicate and high purity sodium aluminate are used. The zeolite, which is precipitated as a powder, is too finely divided for use in fluidized systems. To prepare a fluid catalyst the zeolite powder is mixed with a separately formed hydrosol, also obtained from high purity reactants. Globules of the sol are then introduced into an oil medium, as described in U.S. 2,384,946 to Marisic. Fluidized zeolite adsorbents can be prepared in a similar manner. As described in U.S. 2,865,867 to Van Dyke et al., a composite of alumina and powdered crystalline zeolite is prepared in the form of microspherical particles by spraying an aqueous slurry of wet composite into a stream of hot gas and recovering solid particles. A characteristic of the aforementioned procedures is that the zeolite must be crystallized as a step separate and distinct from catalyst preparation. Among other obvious disadvantages, this requires expensive high purity reactants which greatly add to the cost of the finished catalyst. Similarly, it has been suggested to prepare mechanical blends of precipitated molecular sieve zeolites and relatively coarse clay or the like to provide fluid contact masses. The coarse clay is mixed with the finely divided crystalline zeolite to provide a composition having a particle size distribution more suitable for use in fluidized systems than the fine zeolite powder would be in the absence of the coarse clay additive. These mixtures also require the initial precipitation of the crystalline zeolite from expensive high purity reactants. Also, the composites are not in the form of hard microspheres, which are preferable for fluid catalyst systems.

In efforts to reduce the raw material cost and the number of processing steps involved in the preparation of a crystalline zeolite catalysts, pelleted catalyst composites have been successfully prepared by the hydrothermal reaction in situ of pelleted mixtures of calcined kaolin clay, uncalcined kaolin clay and caustic solution. This produces a solid composite which, before heat activation, contains unreacted kaolin clay and a zeolitic material having an X-ray diffraction pattern which corresponds substantially to that of the material referred to as "zeolite Y" and described in U.S. 3,130,007 to Breck. Similarly, catalyst composites in block form have been prepared from somewhat similar reaction mixtures without the uncalcined clay. However, in attempting to prepare crystalline zeolite catalyst composites from clay-caustic reaction mixtures which produced excellent results when crystallized in situ in the form of extruded pellets or other molded massive form, it was found that the same or similar reaction mixtures did not crystallize or give inconsistent results when produced in the form of micron-size particles by slurrying the reactants in water and then spray drying. In the absence of crystallization, catalysts of the desired properties were not obtained since the crystal habit of the zeolite is related to the catalytic activity of the composite. It was indeed unexpected that micron-size particles were not crystallized from reaction mixtures similar to mixtures which were readily crystallized when molded or shaped in massive form, such as mesh-size pellets.

Accordingly, an object of this invention is to provide a means for overcoming difficulties in preparing microspherical crystalline zeolite catalyst composites in situ from air spray dried reaction mixtures which include caustic solution and calcined clay.

A specific object is the provision of improvements in the spray drying of a mixture of clay and caustic so as to assure that the resulting spray dried microspheres can be crystallized into a component having the X-ray diffraction pattern of a relatively large pore diameter crystalline zeolite.

Other advantages and features will be readily apparent to those skilled in the art.

The present invention is the result of our discovery that difficulties experienced in crystallizing a uniform pore diameter zeolite from microspheres obtained by spray drying reaction mixtures including calcined clays and caustic were being caused by a side reaction taking place between sodium oxide in the uncrystallized microspheres with carbon dioxide in the hot air in the spray dryer. As a result of this discovery, it was found that the desired zeolite could be crystallized from the clay-caustic microspheres by controlling the amount of sodium oxide in the slurry charged to the spray dryer relative to the amount of carbon dioxide in the air in which the reactants were spray dried in a manner such as to maintain the amount of sodium oxide not combined with carbon dioxide at a level sufficiently high to permit zeolite crystallization while preventing excessive sodium oxide concentration which would impair the properties, especially the thermal stability, of the finished catalyst.

The process of this invention is applicable to the preparation of fluid catalysts from reaction mixtures containing sodium hydroxide solution and a specific type of calcined clay, namely kaolin clay that has been calcined at a temperature and for a time such that the characteristic kaolin exotherm has taken place after dehydration of the clay is substantially complete. We prefer, however, to employ this specific type of calcined clay in combination with a form of calcined kaolin clay known as "metakaolin" and obtained by calcination of raw (hydrated) kaolin clay under relatively mild conditions. The mixture of the calcined clays generally leads to the preparation of catalysts having catalytic properties superior to that of catalysts made with the high temperature calcined clay without addition of metakaolin. This invention is also applicable to the processing of mixtures of the aforementioned calcined clay or clays with uncalcined kaolin clay or alkali-inert material that may be employed to impart specific desired properties, such as hardness and/or thermal stability to the microspheres. In any case, the quantity of sodium hydroxide and the concentration of the sodium hydroxide solution used to crystallize the zeolite depends on whether or not uncalcine kaolin clay is present with the other ingredients in the reaction mixture since some of the uncalcined clay appears to react with the alkali. Whatever the explanation, a small additional quantity of caustic must be used when uncalcined kaolin is also present, since this material in some way consumes some of the caustic which would otherwise react with the calcined clay or clays to form the crystalline zeolite.

In accordance with one form of this invention, the desired control of the sodium hydroxide content relative to the concentration of carbon dioxide in the spray dryer is accomplished by adsorbing, or otherwise removing, all or substantially all of the carbon dioxide from the air before the air is used in spray drying. This may be done, for example, by passing cold air through a bed of solid adsorbent, such as lime, and then heating the air in an indirectly fired heating unit. Alternatively, this can be accomplished by passing the air into an aqueous absorbing medium composed, for example, of an aqueous solution of sodium hydroxide. The desorbed air can then be heated in an indirectly fired heating unit. The sodium oxide content of the reaction slurry will depend upon the efficiency of removal of carbon dioxide. When removal is substantially complete, the amount of sodium hydroxide is the same that would be required if the reaction mixture contained less water and the ingredients were reacted and crystallized in macroparticle form, i.e., molded particles within the range of 4 to 325 mesh (Tyler). Thus, when the air in the spray dryer is substantially free from carbon dioxide we employ at least about 0.40 mol $Na_2O$ per mol $Al_2O_3$ in all of the calcined clay or at least about 0.45 mol $Na_2O$ per mol $Al_2O_3$ in all of the calcined clay when a substantial amount of uncalcined kaolin is also employed. When removal of carbon dioxide is incomplete, excess sodium hydroxide in amount equivalent to the carbon dioxide in the drying gases will be required.

In accordance with another form of this invention, the desired control of sodium oxide to carbon dioxide is brought about by carrying out the spray drying step with air that is substantially free from added combustion gases, e.g., air that is indirectly heated, as by means of an electrical heater. Air normally contains a small but significant amount of carbon dioxide (typically about 0.03 percent by volume). Since the volume of air used in spray drying operations is great in comparison with the amount of slurry in the spray drying unit, there is a significant amount of carbon dioxide in air used in the spray dryer even if the air is heated by external means, such as an electrical heater. This is especially true when aqueous slurries having a low solids content are being spray dried. Therefore, the addition of excess caustic to compensate for the presence of carbon dioxide may be required when spray drying a slurry with a low solids content even when the air is free from added combustion gases. Typically, this additional caustic corresponds to about 10 percent to 40 percent of the caustic that would be used if the mixture contained less water and was reacted and crystallized in the form of extruded pellets.

In accordance with still another embodiment of this invention, the spray drying is carried out in air heated by burning combustion gases and the desired control during the spray drying is accomplished by adding a substantial excess of caustic to the reaction mixture to compensate for consumption of caustic by the reaction with carbonaceous combustion gases. In a typical reaction mixture that does not include uncalcined clay, the quantity of caustic in the charge to the spray dryer may be about 0.70 to 1.25 mol $Na_2O$ per mol $Al_2O_3$ in the calcined clay. When uncalcined clay is also present, at least about 0.80 mol $Na_2O$ per mol $Al_2O_3$ in the calcined clay may be required. The additional quantity is from 50 percent to 100 percent of the quantity that would be used if less water were used and the mixture reacted and crystallized in molded macroparticle form.

Before describing our invention in further detail, it should be pointed out that the term "free moisture" or "F.M." as used herein, refers to the weight percent of a material that is eliminated when the material is heated to essentially constant weight with a Cenco Moisture Balance. This instrument employs a sensitive torsional balance for weighing a sample and an infrared lamp for drying the sample. "Volatile matter" or "V.M." is the weight percent of a material that is eliminated when the material is heated to essentially constant weight at 1800° F. In the case of kaolin clay, water accounts for virtually all of the volatile matter and free moisture.

The term "kaolin clay" as used herein encompasses clays, the predominating mineral constituent of which can be kaolinite, dickite, anauxite, nacrite or halloysite. The aforementioned minerals are hydrous crystalline aluminum silicates of the formula $Al_2O_3 \cdot 2SiO_2 \cdot XH_2O$, wherein X is usually 2, except in the case of certain halloysites in which X is 4.

In putting the invention into practice, a reaction mixture suitable for the formation of a fluid composite crystalline zeolite catalyst has a composition falling within the following range:

| | Parts by weight |
|---|---|
| (Hydrous) uncalcined kaolin clay | 0 to 100. |
| (Substantially anhydrous) calcined kaolin clay | 5 to 100. |
| Sodium hydroxide | To provide at least 0.40 mol $Na_2O$ per mol $Al_2O_3$ in the calcined clay. |
| Water | To form sprayable slurry |

The calcined kaolin clay in the table immediately hereabove can be composed substantially completely of kaolin clay that has been calcined at a temperature and for a time such that the characteristic kaolin exotherm at about 1725° F. has taken place after dehydration of the clay is substantially complete. However, as mentioned hereinabove, mixtures of such dehydrated kaolin clay with smaller amounts of kaolin clay calcined under more moderate conditions (i.e., "metakaolin") can also be used. Metakaolin is obtained by thermally dehydrating (calcining) kaolin clay at a temperature within the range of about 1000° F. to about 1550° F. until the volatile matter content of the clay is below 1 percent. Under these conditions, the clay has not undergone the characteristic kaolin exotherm after dehydration. Metakaolin containing the impurities usually present in the parent kaolin clay can be used. These impurities include titania, mica, quartz, feldspar and ferruginous matter. A detailed description of a method for calcining kaolin clay in a Nichols-Herreshoff furnace appears in U.S. 3,014,836 to William J. Proctor, Jr. To obtain metakaolin by the procedure of said patent, the kaolin would be carried only through Heating Zone No. 3 in the Nichols-Herreshoff furnace, wherein all chemically-bound water is removed, and the clay would then be discharged from the furnace.

The high temperature calcined clay is an amorphous material obtained by calcining kaolin clay to a volatile matter content below 1 percent at a temperature within the range of about 1600° F. to 2000° F. and for a time such that clay has undergone the kaolin exotherm after dehydration is substantially completed. Kaolin containing the usual impurities can also be used in forming this material. The kaolin exotherm can be readily determined by differential thermal analysis, using the technique described in Ralph E. Grim's "Clay Mineralogy," page 203, published by McGraw-Hill Book Company, Inc. (1953). This form of calcined clay can be obtained by carrying the clay through the seven heating zones of the Nichols-Herreshoff furnace, as described in U.S. 3,014,836 (supra).

Proportions of metakaolin to the higher temperature dehydrated kaolin clay fall within the range of 0 to 55 parts by weight metakaolin to 100 to 45 parts by weight of high temperature calcined clay (e.g., 15 parts by weight metakaolin and 85 parts by weight of high temperature calcined clay). The ratio of these particular calcined clays affects the steam stability of the catalyst. This in turn affects the durability of the catalyst, because a catalyst which has poor regeneration properties will have a short life. Exceptionally good stability is obtained using our preferred ratio of about 10 to 25 parts by weight of metakaolin to 90 to 75 parts by weight of the higher temperature calcined clay. In reaction mixtures containing uncalcined kaolin, we prefer to employ about 200 parts of uncalcined clay with about 100 parts by weight of the mixture of calcined clays.

As mentioned hereinabove, the quantity of alkali present in the slurry that is charged to the spray drier is selected with due regard to the content of carbon dioxide in the subsequent spray drying operation and will also vary with the presence or absence of uncalcined clay.

Several procedures can be followed in mixing the ingredients. One suitable method is to dry blend the clays, including uncalcined clay and calcined clay (or clays), then add the alkali solution and mix until the ingredients are thoroughly blended. By employing a sufficiently dilute caustic solution, the reaction mixture will be fluid and can be spray dried without further dilution. When uncalcined kaolin is an ingredient of the reaction mixture, our reaction mixture, which has a plastic consistency, can be molded into uniformly sized and shaped, relatively large particles by means of extrusion, for example, and reacted (but not crystallized) in the resulting form at a temperature within the range of about 70° F. to 130° F. for at least 12 hours, preferably 24 to 48 hours. The particles are then agitated intensely in water containing a small amount of sodium hydroxide (in addition to the sodium hydroxide in the reacted particles). The slurry is then spray dried and subsequently crystallized.

Spray dryers with countercurrent, cocurrent or mixed concurrent and cocurrent flow of slurry and hot air can be employed to produce the microspheres. The air can be heated electrically or by other indirect means. As mentioned above, combustion gases obtained by burning hydrocarbon fuel in air can be used as the spray drying fluid provided sufficient caustic is added to the slurry to compensate for the large amount of carbon dioxide in such air. Spraying evaporates water from droplets of the slurry, resulting in the formation of microspheres. Microspheres about 20 to 150 microns in equivalent spherical diameter are desired for most catalytic operations using fluidized contact masses.

In carrying out our invention, air inlet temperatures of about 410° F. and outlet temperatures of about 125° F. have been used successfully with a cocurrent air spray dryer.

The microspheres are reacted by maintaining them at about 70° F. to 130° F. under conditions which prevent dehydration for at least about 12 hours, preferably 24 to 72 hours or more. (With microspheres obtained by slurrying pelleted reaction masses which have been previously maintained under such conditions, this step can be omitted.)

The reaction between the sodium hydroxide and the clay can be carried out while the microspheres are surrounded by air or immersed in an inert oil, especially a hydrocarbon oil.

The microspheres harden and change from a plastic or semi-solid nonplastic mass as a result of the reaction. However, microspheres harden further when crystallized and undergo an additional substantial increase in hardness when thermally activated after the crystallization.

The microspheres can be crystallized by maintaining them at about 150° F. to 250° F. under conditions which prevent dehydration. Usually 24 to 72 hours is required to effect the crystallization. (When prereacted ingredients have been spray dried as described above, the crystallization can be carried out substantially immediately after the microspheres are formed or the microspheres can be maintained at ambient temperature up to about 100° F. before being crystallized at the elevated temperature.) To insure against dehydration, the microspheres are crystallized under conditions such that the vapor pressure generated by the reactants is equal to the vapor pressure generated by the reactants at the crystallization temperature that is used. This will also prevent condensation which may be detrimental to hardness. The simplest methods for carrying out the reaction utilize autogenous pressure. One method is to carry out the reaction in an unvented heated vessel. Another means for maintaining the particles under substantially autogenous pressure is to immerse the particles in a nonreactive hydrocarbon oil maintained at a desirable temperature.

The crystalline material that is formed is a sodium aluminosilicate which has an X-ray diffraction pattern corresponding substantially to that of a rigid three dimensional zeolite having uniform pore openings within the range of 6 to 15 Angstrom units. Using our preferred reaction mixtures, which include a mixture of calcined clays above-described, the crystalline material has an X-ray diffraction pattern corresponding substantially to that of the material referred to as zeolite "Y" in U.S. 3,130,007, especially a form of the zeolite having a $SiO_2/Al_2O_3$ ratio above 4 (as determined by X-ray diffraction).

The sodium zeolite is ion-exchanged to prepare catalysts of specific desired properties. For example, the following ionizable compounds can be used to replace a substantial amount of the alkali metal of the zeolite: salts of ammonium, barium, calcium, magnesium, manganese, vanadium, chromium, cobalt, nickel, iron, zinc, aluminum, rare earth metals (lanthanum, praseodymium, neodymium, cerium and samarium), hydrogen, noble metals such as platinum and palladium, mixtures of the foregoing together or with ammonium. The specific effects of these, as well as other cations, of Group Ib through Group VIII of the Periodic Table on molecular sieve-type cracking catalysts are well known in the art. Reference is made to Chemical Week (supra) and patents referred to therein. The salts used in the base exchange operation can be inorganic, such as the chloride, or organic, such as the acetate. Normally, the ionizable salt will be used in the form of an aqueous solution. Conditions of time and temperature for base exchanging alkali metal alumino-silicates are well known and can be used in carrying out the ion-exchange.

To activate the ion-exchanged masses and adjust the activity to a desired level, the masses can be steamed at about 1000° F. to about 1600° F. with 100 percent steam for 2 to 4 hours. This steaming also dehydrates the masses and hardens them. If desired, the masses can be calcined in air at temperatures of the order of 800° F. to 1200° F. for times ranging from ½ to 24 hours before the steaming operation or they can be calcined in air at temperatures up to about 1700° F. instead of steaming.

This invention and its features will be understood more fully by the following examples.

All X-ray diffraction referred to herein refers to patterns obtained from random powder patterns using the K-alpha doublet of copper as the source of X-radiation, a receiving slit width of 0.006", a Norelco specimen holder having a sample area of 0.812" x 0.408", a scintillation counter with pulse height analyzer, a scanning rate of 4° per minute, a time constant of 2 seconds, a scanning direction increasing from 2° to 90° and a strip chart pen recorder. Specimens were equilibrated at 25° C. and 40 percent to 50 percent relative humidity for at least 18 hours prior to X-raying. Peak heights (counts per second, or "c./s.") and positions were recorded on a strip chart. In view of the similarity between the diffraction patterns of zeolites X and Y, each of which has a characteristic maximum at 6.2° 2θ, zeolite X was distinguished from zeolite Y by applying to X-ray powder diffraction patterns of products the criterion set forth in Table III of a publication by Donald C. Freemen, Jr. entitled, "Electrical Conductivity of Synthetic Crystalline Zeolites," Journal of Chemical Physics, vol. 35, No. 3, September 1961. Table III in said publication correlates unit cell dimension with $SiO_2/Al_2O_3$ ratio. The silica-to-alumina molar ratio of zeolite Y products was determined from the unit cell dimensions derived from X-ray diffraction patterns. In estimating percent crystallization zeolite of products, a commercial sample of high purity sodium zeolite was used as the reference. Percent sieve in samples was estimated by observing the intensity of two characteristic peaks in c./s. and comparing the intensity of these peaks with the intensity of the corresponding peaks in the commercial sample.

The "Cat-D" test referred to in the examples is a modification of the "Cat-A" method described in "Laboratory Method for Determining the Activity of Cracking Catalysts," by J. Alexander and H. E. Shimp, page R537, National Petroleum News, Aug. 2, 1944. In carrying out the Cat-D test, a heavy gas oil feedstock was used and cracking was carried out at 900° F. with 10 percent steam and a liquid space rate of 1.0 (volume charge/volume of catalyst/hour) for a 15-minute operation period. To place the microspheres in a physical form amenable to Cat-D testing, samples were tabletted by compression in a Stokes press before testing.

The term "kaolin coke factor" used in presenting catalytic data refers to a value obtained by comparing coke make of the experimental catalyst with that of a commercial kaolin catalyst at the same conversion (extrapolated).

EXAMPLE I

A fluid catalyst was prepared, in accordance with an embodiment of this invention, from a mixture of the following clays:

| Physical characteristics | Satintone No. 1 | Satintone No. 2 | Min. Chem. special |
|---|---|---|---|
| Specific gravity | 2.63 | 2.50 | 2.58 |
| Moisture, maximum wt. percent | 1.0 | 1.0 | 1.0 |
| Wt. percent +-325 mesh (wet screen) | 0.5 | 0.5 | 0.5 |
| Average particle size, microns | 2.0 | 4.5 | 3.5 |
| pH | 5.8-6.3 | 5.8-6.3 | 3.8-5.0 |
| Typical chemical analysis (moisture weight basis): | | | |
| Ignition loss at 1,800° F., percent | 0.5 | 0.9 | 13.8 |
| Silica, percent | 52.3 | 52.1 | 45.4 |
| Alumina, percent | 44.6 | 44.4 | 38.8 |
| Iron Oxide, percent | Trace | Trace | 0.3 |
| Titanium Dioxide, percent | 2.0 | 2.0 | 1.5 |
| Calcination treatment | (1) | (2) | (3) |
| Composition | (4) | (5) | (6) |

1 Calcined above exotherm.
2 Calcined below exotherm.
3 Uncalcined.
4 Amorphous.
5 Amorphous (metakaolin).
6 Crystalline (kaolinite).

4757 grams of Satintone #1, 793 grams of Satintone #2 and 11,100 grams of the Min-Chem Special clay were blended for 10 minutes in a screw-type pug mill. 6705.7 grams of a 17.0 percent (weight basis) aqueous solution of sodium hydroxide was added to the charge in the pug mill and the mixture was pugged for 20 minutes to an extrudable consistency. The mol ratio of $Na_2O$ to the $Al_2O_3$ of the two Satintones was 0.570 to 1.00. The temperature was about 90° F. after pugging was completed.

The mixture was extruded in a worm-type extruder having 0.17" diameter holes and the extrudate was cut into pellets about ½" long as they issued from the extruder. The extrudate temperature gradually increased to a temperature of about 125° F. after ½ hour of operation. The freshly extruded pellets were placed in one gallon glass jars with the pellets substantially filling the jars. The jars were sealed tightly by means of screw caps and placed in an oven maintained at 100° F. for about 72 hours.

Eight thousand grams of the pellets were placed in a large Waring Blendor with 8000 grams of an 0.84 percent (weight basis) aqueous solution of sodium hydroxide. The mol ratio of total $Na_2O$ to $Al_2O_3$ in the calcined clays was 0.665 to 1.00 after the additional caustic was added to control the relative proportions of $Na_2O$ and carbon dioxide in the spray dryer. The pellets and solution were agitated in the Waring Blendor without addition of heat for 10 minutes at high speed. This resulted in the physical destruction of the pellets and the formation of a fluid pumpable slurry.

A portion of the slurry was then spray dried in a co-current air spray dryer. The drying chamber of the spray dryer had a 2 ft. 7 in. inside diameter with a 2 ft. cylindrical height and a 60° conical bottom. Near the top of the chamber the unit had a centrifugal atomizer wheel with built-in air turbine drive for speeds up to 40,000 r.p.m. The wheel was designed for two-stage atomization to insure consistent particle formation. The dryer also contained a centrally located insulated duct for introducing drying air. Air passing through the duct was discharged into the chamber below the atomizer wheel through an air disperser designed to assure uniform mixing of air and liquid spray. The drying air was forced through the system by a blower provided with means for controlling the volume of exhaust air. The dryer was also equipped with two separate air heaters with a damper for selecting the desired source of heat. One of these heaters was a 4.5 kw. electrical air heater. The other heater was a direct gas-fired air heater. A stainless steel duct was located adjacent the bottom of the chamber. A cyclone collector was connected to this duct for separating the spray dried solids from the exhaust air.

In the preparation of the catalyst, the air in the spray dryer was electrically heated to an inlet temperature of 420° F. After an initial start-up period of ½ hour, a product was collected over a period of 42 minutes. During the collection, the inlet air temperature ranged from 410° F. to 430° F. and the outlet temperature was 124° F. ±2° F. The damper was fully closed during the run to decrease the air flow in the spray dryer. The free moisture content of the spray dried product was 23.2 percent by weight.

Samples of the spray dried microspheres were placed in glass jars which were sealed tightly with screw tops. Three of the jars were placed in an oven maintained at 200° F. One of these jars was held in the 200° F. oven for 24 hours, another for 48 hours and another for 72 hours. A fourth sealed jar was placed in a 100° F. oven for 48 hours and then placed in a 200° F. oven for an additional 48 hours. Each sample was X-rayed to identify the crystalline zeolite and to estimate the percentage of zeolite present. All samples were found to be quite similar and the composite was found (by X-ray analysis) to contain 17 percent of a crystalline zeolite having the X-ray diffraction pattern of zeolite Y having a $SiO_2/Al_2O_3$ of 4.3. The four samples of crystallized zeolite were then combined in a gallon jar and blended. The product weight was 1445 grams with a volatile matter of 34 percent.

The crystallized microspheres were exchanged in a batch exchange treatment with a 1.0 Normal aqueous solution of ammonium nitrate, using 1 equivalent $NH_4+$ per equivalent of $Na+$ in the microspheres. The exchange was carried out by mixing the microspheres with the 1 Normal ammonium nitrate solution in glass jars and stirring the charge for one hour while maintaining the temperature at 180° F. The exchanges were carried out until the $Na_2O$ conent of the product was less than 0.58 percent, on a volatile-free weight basis. Eight exchanges were used.

The microspheres were pelletized to place them in a condition suitable for catalytic testing, activated in 100 percent steam at 1550° F. for four hours and evaluated for catalytic activity by the "Cat–D" method.

Similar runs were made with a comercial crystalline zeolite catalyst in the cracking unit. A summary of the test data is given in the accompanying table. In order to compare the thermal stability of the two catalysts, a sample of the commercial crystalline zeolite catalyst was steamed with 100 percent steam at 1550° F. for 4 hours and its zeolite content before and after steaming were compared with the zeolite content of the experimental catalyst before and after similar treatment. The results are also sumarized in the table.

CATALYTIC ACTIVITY AND STEAM STABILITY OF FLUID CRYSTALLINE ALUMINOSILICATE ZEOLITE CRACKING CATALYSTS

|  | Catalyst | |
| --- | --- | --- |
|  | Commercial crystalline zeolite catalyst | Experimental crystalline zeolite catalyst |
| Product distribution: |  |  |
| Gasoline, vol. percent | 37.5 | 50.4 |
| Coke, wt. percent | 2.16 | 1.97 |
| Gas, wt. percent | 13.49 | 15.86 |
| Gas gravity (air=1.0) | 1.36 | 1.47 |
| Conversion, percent | 46.8 | 59.6 |
| Kaolin coke factor | 0.83 | 0.41 |
| Percent cystalline zeolite, initial | 9 | 17 |
| Percent crystalline zeolite, after steaming at 1550° F./4 hr. (100 percent steam) | 0 | 12 |

The data in the table show that the experimental catalyst was more selective than the commercial zeolite catalyst and operated at a much higher conversion level. The data therefore indicate that the experimental catalyst had superior cracking properties.

The data show also that the experimental catalyst lost only about 30 percent of its content of crystalline zeolite during steaming. In contrast, the commercial catalyst lost 100 percent of its crystallinity with the same steam treatment. The data therefore indicate that the catalyst of the present invention had markedly greater steam stability than the commercial catalyst.

EXAMPLE II

To demonstrate the necessity for controlling the proportion of sodium oxide in the slurry to carbon dioxide in the spray dryer in preparing a fluid catalyst by air spray drying a mixture of calcined clay and caustic solution, an 8000 gram sample of the pelleted mixture of clays of Example I which had been reacted but not crystallized at 100° F., as described in Example I, was slurried in 8000 grams of water, instead of the dilute sodium hydroxide solution of Example I. The mol ratio of $Na_2O$ to $Al_2O_3$ in the calcined clays in this slurry was 0.570 to 1.000. (In Example I the ratio was 0.665 to 1.000.) The slurry was spray dried under the conditions used in preparing the zeolite catalyst of Example I and attempts were then made to crystallize hydrothermally the resulting microspheres to produce a composite crystalline zeolite catalyst. In these attempts to crystallize the microspheres, various crystallization conditions were employed. For example, the microspheres were held in sealed jars at 100° F. for periods ranging from 0 to 72 hours and then the sealed jars were held at 200° F. for times ranging from 24 to 72 hours. These attempts were unsuccessful. At best, only traces of zeolite appeared in the X-ray diffraction patterns of the products. A comparison of these results with those of Example I, in which extra caustic was used to compensate for the presence of carbon dioxide in the air in the spray dryer, show that the preparation of a composite zeolite catalyst by spray drying a mixture of caustic and calcined clays was unsuccessful when the ratio of sodium oxide to carbon dioxide was too low.

EXAMPLE III

To demonstrate further the necessity for controlling the relative proportions of sodium oxide in the slurry and oxides of carbon in the air spray dryer, a portion of the slurried clay caustic pellets of Example I ($Na_2O$ to $Al_2O_3$ ratio of 0.665 to 1.000) was spray dried with air heated with the gas fired heater whereby combustion products were present in the air. Attempts to crystallize these microspheres were unsuccessful, apparently because the proportion of sodium oxide to carbon dioxide was too low.

EXAMPLE IV

The procedure of Example I was repeated but with 8000 grams of the pellets slurried in 8000 grams of a 5.52 percent sodium hydroxide solution instead of the 0.84 percent sodium hydroxide solution of Example I. In this case, the mol ratio of total $Na_2O$ to total $Al_2O_3$ in the calcined clays was 1.03 to 1. The crystallized microspheres were then exchanged with 1 Normal ammonia nitrate solution until the $Na_2O$ content of the microspheres was less than 0.58 percent (14 exchangers). The exchanged pelletized microspheres were then treated with 100 percent steam at 1550° F. for 4 hours, as in Example I.

In this case, a zeolite crystallized and an X-ray diffraction pattern of the product indicated that the product contained 23 percent of a zeolite having the X-ray diffraction pattern substantially the same as sodium zeolite Y having a relatively low $SiO_2/Al_2O_3$ ratio of about 3.3. The catalyst, however, was found to be markedly inferior to the catalyst of Example I since it produced only 31.4 percent gasoline at a 36.9 percent conversion. A comparison of the results realized using a $Na_2O/Al_2O_3$ ratio of 1.03 to 1 with the results of Example I using a $Na_2O/Al_2O_3$ ratio of 0.665 to 1 and Example II using a $Na_2O/Al_2O_3$ ratio of only 0.570 to 1, indicate that when preparing a fluid catalyst by spray drying a reaction mixture including calcined kaolins and caustic solution, the sodium oxide content of the slurry must be high enough to compensate for the presence of carbon dioxide in the air in the spray dryer but must not be excessive.

We claim:

1. In a method for making a substantially microspherical crystalline zeolite catalyst by forming a reaction mixture comprising calcined kaolin clay and aqueous sodium hydroxide solution in amount to provide at least 0.4 mol $Na_2O$ per mol $Al_2O_3$ in said calcined clay, spray drying said mixture in hot air to form microspheres, subjecting the spray dried microspheres to hydrothermal treatment without dehydration so as to crystallize a zeolite in the microspheres and ion-exchanging the crystallized microspheres with nonalkali-metal ions, the improvement which comprises:

while spray drying the mixture in hot air, controlling the amount of sodium oxide in the mixture relative to the amount of carbon dioxide in the hot air so as to maintain the amount of sodium oxide sufficiently high to permit crystallization of a zeolite in the microspheres.

2. The method of claim 1 wherein said relative amount of sodium oxide and carbon dioxide is controlled by removing carbon dioxide from the air before the air is employed in spray drying.

3. The method of claim 1 wherein said mixture is spray dried in hot air that includes carbonaceous combustion gases obtained by burning a hydrocarbon fuel in air and the content of sodium oxide is maintained sufficiently high to assure zeolite crystallization by utilizing, in addition to the sodium hydroxide that would be required to crystallize the zeolite if said reaction mixture contained less water and were formed into massive particles by molding, an additional substantial quantity of sodium hydroxide substantially equivalent to the amount of carbonaceous combustion gases in the hot air.

4. The method of claim 1 in which said mixture is spray dried in air free from added combustion gases and the content of sodium oxide is maintained sufficiently high to assure zeolite crystallization by utilizing, in addition to the sodium hydroxide that would be required to crystallize the zeolite if said reaction mixture contained less water and were formed into massive particles by molding, a small additional quantity of sodium hydroxide equivalent substantially to the amount of carbon dioxide in the hot air.

5. A method for making a substantially microspherical crystalline zeolite catalyst which comprises forming a reaction mixture comprising:
  (a) kaolin clay calcined at a temperature and for a time sufficient for the characteristic exothermic reaction to take place after dehydration is substantially completed;
  (b) metakaolin in minor weight proportion in comparison to (a);
  (c) uncalcined kaolin clay in amount exceeding the combined amount of (a) and (b); and
  (d) a dilute aqueous solution of sodium hydroxide solution to provide at least 0.45 mol $Na_2O$ per mol $Al_2O_3$ in (a) and (b);
spray drying the mixture in hot air while controlling the amount of sodium oxide in the mixture relative to the amount of carbon dioxide in the hot air so as to maintain the sodium hydroxide content of the microspheres sufficiently high to permit crystallization of a zeolite in the microspheres,
subjecting the spray dried microspheres to hydrothermal treatment without dehydration so as to crystallize a zeolite in the microspheres, ion-exchanging the micropheres with nonalkali-metal cations and heat-treating the microspheres.

6. The method of claim 5 wherein said relative amounts of sodium oxide and carbon dioxide is controlled by removing carbon dioxide from air before it is employed in spray drying and using sodium hydroxide in amount corresponding substantially to the amount that would be required to crystallize the zeolite if said reaction mixture contained less water and were crystallized in the form of extruded pellets.

7. The method of claim 5 wherein said slurry is spray dried in hot air that includes carbonaceous combustion gases obtained by burning a hydrocarbon fuel in air and the content of said sodium hydroxide is maintained sufficiently high to assure zeolite crystallization by utilizing, in addition to the sodium hydroxide that would be required to crystallize the zeolite if said reaction mixture contained less water and were crystallized in the form of extruded pellets, an additional substantial quantity of sodium hydroxide substantially equivalent to the amount of carbon dioxide in the hot air.

8. The method of claim 5 in which the slurry is spray dried in air free from added combustion gases and the content of said sodium hydroxide is maintained sufficiently high to assure zeolite crystallization by utilizing, in addition to the sodium hydroxide that would be required to crystallize the zeolite if said reaction mixture contained less water and were crystallized in the form of extruded pellets, a small additional quantity of sodium hydroxide, equivalent substantially to the amount of carbon dioxide in the hot air.

9. A method for making a microspherical composite base material suitable for use in the preparation of a hydrocarbon cracking catalyst which comprises forming a plastic mixture comprising aqueous sodium hydroxide solution, uncalcined kaolin clay and calcined kaolin clay,
  compressing said mixture into uniformly sized and shaped coherent plastic mesh-sized particles,
  maintaining said particles out of contact with an external aqueous phase without dehydrating the particles at a temperature within the range of 70° F. to 130° F. until the mesh-sized particles harden but do not crystallize,
  preparing an aqueous slurry of said mesh-sized particles,
  spray drying said slurry in air free from added combustion gases, and
  subjecting the microspheres to hydrothermal treatment until a zeolite crystallizes.

10. The method of claim 9 wherein said aqueous slurry of said mesh-sized particles is obtained by slurrying said particles in a dilute aqueous solution of sodium hydroxide having a concentration less than one percent.

References Cited

UNITED STATES PATENTS

| | | | |
|---|---|---|---|
| 2,865,867 | 12/1958 | Van Dyke et al. | 252—448 X |
| 3,185,544 | 5/1965 | Maher | 23—112 |
| 3,276,993 | 10/1966 | Reid | 252—455 X |
| 3,338,672 | 8/1967 | Haden et al. | 23—112 |

DANIEL E. WYMAN, *Primary Examiner.*

C. F. DEES, *Assistant Examiner.*

U.S. Cl. X.R.

252—448, 455

UNITED STATES PATENT OFFICE
CERTIFICATE OF CORRECTION

Patent No. 3,433,587                                March 18, 1969

Walter L. Haden, Jr., et al.

It is certified that error appears in the above identified patent and that said Letters Patent are hereby corrected as shown below:

Column 2, line 28, "crystalline zeolite catalysts," should read -- crystalline zeolite catalyst --. Column 3, line 36, "whether or not uncalcine" should read -- whether or not uncalcined --. Column 8, in the table, first column, lines 6 and 7 thereof, "moisture" should read -- moisture-free --.

Signed and sealed this 14th day of April 1970.

(SEAL)
Attest:

Edward M. Fletcher, Jr.
Attesting Officer

WILLIAM E. SCHUYLER, JR.
                                                              Commissioner of Patents